2,718,499
Patented Sept. 20, 1955

2,718,499

LUBRICANTS CONTAINING ETHERS WITH MULTIPLE SULFUR LINKAGES

George E. Barker, Newport, Del., and George E. Alter, Jr., Star Lake, N. Y., assignors to Elgin National Watch Company, Elgin, Ill., a corporation of Illinois No Drawing. Application March 15, 1951, Serial No. 215,856

5 Claims. (Cl. 252—34.7)

In our copending application, Ser. No. 552,814, filed September 5, 1944, there have been described the preparation of triple sulfur and selenium ethers and their use as lubricants. In United States Patent No. 2,552,510 granted thereon, we have claimed certain alkyl triple ethers. This patent application is a continuation-in-part of the aforesaid parent application: and is concerned with similar lubricants having multiple sulfur linkages and exhibiting non-spreading properties in contact with steel, brass, and jewel surfaces such as ruby and sapphire. Such lubricants have physical and chemical properties which fit them for service where atmospheric and other influences tend to deprive prior lubricants of their desirable attributes or to cause attack upon contacting surfaces. The compounds described and claimed herein are organic substances containing three divalent sulfur atoms separated from one another by one or more carbon atoms and having terminal alkyl and aryl groups and can be represented by the structural formula $R_1$—S—$A_1$—S—$A_2$—S—$R_2$, where the three sulfur atoms are in a chain including the intermediate alkyl groups $A_1A_2$ of one or more carbon atoms, and the terminal groups $R_1R_2$ of which one is alkyl and the other aryl: more specifically the preferred compounds can be represented by the said formula, in which $R_1$ and $R_2$ are respectively amyl and benzyl groups, and $A_1$ and $A_2$ are ethyl or propyl groups. The lubricant is present in the form of a mixture of isomers or homologs whereby a low melting point or pour point is exhibited. It is presently preferred to have the groups which are in chain between sulfur atoms comprised of two or three carbon atoms.

These compounds may be designated as ethers having multiple thio-linkages. They can be prepared in various ways, such as the following:

(a) *Preparation of amylthiopropyl chloride from trimethylene chlorohydrin*

A solution of 440 grams of sodium hydroxide in 2000 cc. of water was agitated with 1144 grams of mixed amyl mercaptans (available commercially under that name) and was heated until the mixture began to reflux. Heating was then discontinued, and 940 grams of trimethylene chlorohydrin were slowly run into the vigorously agitated mixture. When the heat of reaction had subsided, external heating was resumed, and the reaction mixture was stirred and maintained at refluxing temperature overnight. The material was then cooled and separated, and the aqueous layer was discarded. The oil layer was washed once with an excess of dilute hydrochloric acid, and was then washed several times with water until the final wash waters were found to be practically neutral. After having been dried over anhydrous sodium sulfate, this oil was distilled. There were obtained 1417 grams of mixture of amylthiopropanols which distilled at a temperature of 120–125° C. under a pressure of approximately 10 millimeters of mercury.

The mixture of amylthiopropanols prepared above was placed in a water-cooled container and was saturated with hydrogen chloride by bubbling the gas through the liquid. Then, while the alcohol was stirred and the addition of hydrogen chloride was continued, 412 grams of phosphorus trichloride were slowly run into the solution. During this addition the temperature of the mixture was held below 25° C., but upon completion of the phosphorus trichloride addition, the water-cooling was discontinued and the mixture was heated to 90° C. and held there with continued stirring for four hours. The material was then cooled, and 100 cc. of water were added, whereupon the mixture separated into three layers. The lower, heavy layer, which was miscible with water, was drawn off and discarded. The intermediate layer, of comparatively small volume, was also discarded. The upper layer was washed with successive portions of water till it was neutral, and was then dried over anhydrous sodium sulfate and distilled. There were obtained 830 grams of amylthiopropyl chloride which distilled between 105 and 120° C. at a pressure of approximately 20 millimeters of mercury. This material was determined by analysis to contain 17.5 per cent sulfur and 22.5 per cent chlorine, as compared to the theoretical values of 16.8 per cent sulfur and 18.7 per cent chlorine.

(b) *Preparation of benzyl mercaptan*

While benzyl mercaptan is an article of commerce, the following procedure is given by way of completeness.

A mixture of 1140 g. (15 moles) of thiourea and 4000 cc. of methanol is placed in a 3-neck, 12 l. flask equipped with a stirrer, a reflux condenser, a dropping funnel, and a steam bath. The mixture is stirred and the methanol is refluxed until the thiourea has dissolved. Steam heating is then discontinued, and 1905 g. (15 moles) of benzyl chloride are very slowly added through the dropping funnel at a rate just sufficient to allow the heat of reaction to maintain refluxing of the methanol. After completion of the addition, steam heating is resumed, and the mixture is kept stirred and refluxing for three hours. Then a solution of 720 g. (18 moles) of sodium hydroxide in 3500 cc. of water is slowly added, after which stirring and refluxing are continued for an additional three hours. The contents of the flask are then allowed to cool and to separate into two layers, and these layers are separated. The aqueous phase is acidified with hydrochloric acid, and the organic material is removed by extraction with benzene. The benzene extract is combined with the non-aqueous phase (crude mercaptan), the whole is washed once with dilute hydrochloric acid, and then the crude organic liquid is washed with successive portions of fresh water until the final washings are neutral. Then the crude mercaptan solution is dried over anhydrous sodium sulfate and is distilled at atmospheric pressure. When the temperature of the vapor in the still has risen to 185° C., the still is connected to a water aspirator vacuum pump, the pressure is lowered to 300 mm. of mercury, and distillation is continued. About 1600 g. of benzyl mercaptan, boiling at 160–170° C./300 mm., are obtained as product.

(c) *Preparation of benzylthiopropyl chloride*

A mixture of 1890 g. (about 12 moles) of trimethylene chlorobromide, 1488 g. (about 12 moles) of benzyl mercaptan, 960 cc. of methanol, and 3480 cc. of water is placed in a 3-neck 12 l. flask equipped with a mechanical stirrer, a reflux condenser, a dropping funnel, and a steam bath. The mixture is stirred and heated until it refluxes, after which steam heating is discontinued and a solution of 480 g. (12 moles) of sodium hydroxide in 3000 cc. of water is added at a rate just sufficient to maintain vigorous refluxing. After completion of this addition, steam heating is resumed, and the mixture is refluxed for an additional two hours. The material is then cooled, the phases are separated, and the aqueous phase is discarded. The non-aqueous phase is washed once with dilute hydrochloric acid and several times with successive portions of fresh water until the final washings are neutral. Then the oil is dried over anhydrous sodium sulfate and distilled under vacuum. A yield of 1692 g. of benzylthiopropyl chloride, boiling at 125–150° C./1 mm., is obtained.

*(d) Preparation I for amylthio-benzylthio-dipropyl sulfides*

415 grams of amylthiopropyl chloride and 490 grams of benzylthiopropyl chloride were mixed and slowly added to a refluxing solution of 625 grams of crystalline sodium sulfide ($Na_2S.9H_2O$) dissolved in a mixture of 2000 cc. of methanol and 1000 cc. of water. The reaction mixture was then stirred and refluxed overnight. The methanol was subsequently removed by distillation over a steam bath; and the residual material was cooled and separated, the aqueous layer being drawn off and discarded. The oily layer was then washed once with dilute hydrochloric acid and several times with successive portions of water until the final wash waters were found to be neutral. The oil was then dried over anhydrous sodium sulfate, and was distilled. There were obtained about 540 grams of amylthio-benzylthio-dipropyl sulfide which distilled between 190 and 210° C. at a pressure of approximately 2 millimeters of mercury.

In order to remove the last traces of corrosive impurities from this material, it was agitated for two hours with 150 cc. of a 5 per cent solution of cupric chloride. The aqueous solution was then drawn off and discarded, and the oil was filtered, washed once with fresh water, and agitated with a saturated aqueous solution of hydrogen sulfide for two hours. Once again the aqueous layer was separated and discarded and the purified oil was filtered, dried and redistilled in vacuo.

An alternative method of preparation is to prepare amylthiopropyl mercaptans, and then react in equimolecular proportions with benzylthiopropyl chloride.

*(e) Preparation of isomeric mixture of amylthiopropyl mercaptans*

A mixture of 760 g. (10 moles) of thiourea and 4000 cc. of 95 per cent ethanol is placed in a 3-neck, 12 l. flask equipped with a mechanical stirrer, a reflux condenser, a dropping funnel, and a steam bath. The mixture is stirred and refluxed until the thiourea is dissolved and then, while heating is continued, 1810 g. (10 moles) of amylthiopropyl chloride are slowly added. The mixture is stirred and refluxed continuously for five days. At the expiration of this time, a solution of 600 g. (15 moles) of sodium hydroxide in 4000 cc. of water is added slowly, after which refluxing and stirring are continued for another four hours. The mixture is then allowed to cool and is made slightly acid by the addition of dilute hydrochloric acid. The two phases are permitted to separate. The aqueous phase is extracted with benzene and the benzene extract is combined with the organic phase. The combined organic phases are then washed with successive portions of fresh water until the washings are neutral. Finally the oil is separated from the last wash water, is dried over anhydrous sodium sulfate, and is distilled. There is obtained a yield of 1179 g. of amylthiopropyl mercaptan boiling at 140–150° C./35 mm.

*(f) Preparation of amylthiopropyl-benzylthiopropyl sulfide*

In a 3-neck, 12 liter flask, equipped with a mechanical stirrer, a reflux condenser, and a dropping funnel, are placed 400 g. (10 moles) of sodium hydroxide and 5000 cc. of 95 per cent ethyl alcohol. The stirrer is started, and the flask is heated by means of a steam bath until all the caustic dissolves and the solution begins to reflux. To the refluxing solution are slowly added 1600 g. (9 moles) of amylthiopropyl mercaptan. Then steam heating is discontinued, and 1810 g. (9 moles) of benzylthiopropyl chloride are added at a rate just sufficient to allow the heat of reaction to maintain refluxing in the flask. When the addition of the chloride is completed, steam heating is resumed, and the reaction mixture is stirred and refluxed for an additional three hours. At the end of this time, the mixture is cooled and filtered, and the filtrate is allowed to separate into two phases. The aqueous phase is discarded. The organic phase (crude product) is washed with dilute hydrochloric acid and then rewashed with successive portions of fresh water until the final wash waters are neutral. In order to facilitate separation of the oily layer from the wash waters, it may be advisable to reduce the density of the oil by diluting it with benzene. When the oil has been washed neutral, it is dried over anhydrous sodium sulfate, and the low boiling constituents are removed by heating the mixture to 125° C. under the vacuum produced by a water aspirator. The oil is then heated to 210° C. under a pressure of 1 mm. of mercury for a short while in order to remove the last traces of volatile materials. Following this stripping, the oil is cooled and is stirred for several hours with 0.5 per cent of its weight of sublimed litharge (lead oxide). The litharge is removed by the addition of a filter aid and subsequent filtration. The oil is further purified by being stirred for several hours with one per cent of its weight of activated carbon (decolorizing carbon). The carbon, like the litharge, is removed by adding a small amount of filter aid and filtering the solution. Finally, the last traces of moisture are removed by agitating the oil with a good grade of anhydrous desiccant calcium sulfate (Drierite) for 3 hours. After final filtration to remove the calcium sulfate, the oil is ready for use. A yield of 2415 g. is obtained.

Compounds having the R groups with a different aryl hydrocarbon radical than benzyl, or R' groups of higher carbon number than amyl can be prepared by substituting the corresponding mercaptans. Similarly, the number of carbons in the intermediate groups (that is, the integer value of $m$ and $n$ being 2 to 5) may be controlled by employing other than trimethylene compounds in provoking the thio-ether formation from the mercaptans; e. g., ethylene chlorohydrin or ethylene chlorobromide is employed to form substituted diethyl sulfides, etc., and pentamethylene chlorohydrin or pentamethylene chlorobromide to form substituted diamyl sulfides, etc.

Examples of practice are:

*Example I*

The mixture of amylthio-benzylthio-dipropyl sulfides prepared as above is a non-spreading lubricant with a very low coefficient of friction values between steel and jewel surfaces and an exceedingly low rate of evaporation. Its pour point is in the neighborhood of minus 90° F. The kinematic viscosity at 100° F. is about 11.7 centistokes, and at 32° F. about 60.7 centistokes. The evaporation was negligible, being less than 2 per cent after 100 hours at 70 degrees C. with ½ cubic feet nitrogen passing through 1 gram sample. The surface tension is around 36.6 dynes per centimeter.

*Example II*

99.5 parts by weight of the amylthio-benzylthio-dipropyl sulfides of Example II were mixed with 0.2 part of p-tertiary butyl catechol, and 0.3 part of dodecylpiperidine stearate, with thorough stirring. The mixture is a non-spreading oil having like properties: such as a pour point around minus 90 degrees F.; the same kinematic viscosities; no cloud point noted down to minus 90 degrees F.; weight loss of brass block in standard corrosion test 0.0025 per cent; evaporation below 2 per cent on the stated test; contact angle on steel around 29 degrees and on ruby around 30 degrees; coefficient of friction on sapphire 0.1020; surface tension around 36.6 dynes per centimeter at 77 degrees C.

The dodecylpiperidine stearate is an oilness agent, and others may be substituted as taught in the Barker Patent 2,412,956: for example, a like weight of amylthiopropyl piperidine stearate may be used. The p-tertiary butyl catechol acts as an anti-oxidant. Also 1 part by weight of a resin such as polystyrene (e. g. the commercial material having a molecular weight around 20,000) may be added to improve the viscosity-temperature relationship. In lieu of the amylthio-benzylthio-dipropyl sulfides of the above examples, amylthio-benzylthio-diethyl sulfides may be used, with essentially the same low pour point, the viscosity values, and the surface tension. However, the evaporation rate is slightly higher, but the materials are satisfactory for commercial employments at temperatures below 55% C. for long periods of time.

Thus, the preferred terminal radicals are amyl and benzyl; and the preferred intermediate radicals are ethyl, propyl and isopropyl.

We claim:

1. A lubricant consisting of 99.5 parts of amylthio-benzylthio-dipropyl sulfides, 0.2 part of p-tertiary butyl catechol, and 0.3 part of dodecylpiperidine stearate; and characterized in having a pour point of about minus 90 degrees F., no cloud point down to about minus 90 degrees F., and being non-spreading on steel and jewel surfaces.

2. A lubricant consisting amylthio-benzylthio-dialkyl sulfides, the said alkyl groups having a chain of 2 to 5 carbon atoms; said lubricant being characterized in having a viscosity at 100 degrees F. of about 11.7 centistokes, a viscosity at 32 degrees F. of about 60.7 centistokes, cloud and pour points at about minus 90 degrees F., a surface tension of about 36.6 dynes per centimeter, and in being non-spreading on steel and jewel surfaces.

3. A lubricant consisting of amylthio-benzylthio-dipropyl sulfides; and characterized in having a pour point of about minus 90 degrees F., no cloud point down to about minus 90 degrees F., and being non-spreading on steel and jewel surfaces.

4. The method of lubricating relatively moving parts at temperatures as low as minus 90 degrees F., which comprises employing between said surfaces a lubricant consisting of amylthio-benzylthio-dialkyl sulfides, the said alkyl groups having a chain of 2 to 5 carbon atoms, said lubricant being characterized in having cloud and pour points at about minus 90 degrees F. and a surface tension of about 36.6 dynes per centimeter.

5. The method as in claim 4, in which the lubricant consists of amylthio-benzylthio-dipropyl sulfides.

References Cited in the file of this patent

UNITED STATES PATENTS

| | | |
|---|---|---|
| 2,230,966 | Reid et al. | Feb. 4, 1941 |
| 2,552,510 | Barker et al. | May 15, 1951 |